United States Patent

Horsewell et al.

[11] 3,900,037
[45] Aug. 19, 1975

[54] TOBACCO-SMOKE FILTERS

[75] Inventors: Henry George Horsewell, Totton; John Anthony Luke, Woodlands, both of England

[73] Assignee: Brown & Williamson Tobacco Corporation, Louisville, Ky.

[22] Filed: Nov. 27, 1972

[21] Appl. No.: 309,691

Related U.S. Application Data

[63] Continuation of Ser. No. 95,370, Dec. 4, 1970, abandoned.

[30] Foreign Application Priority Data
Dec. 24, 1969 United Kingdom............ 062825/69

[52] U.S. Cl. .................. 131/10; 131/267; 428/377
[51] Int. Cl............................................. A24c 5/50
[58] Field of Search ........ 117/11, 68, 157; 131/267; 260/31.2 R

[56] References Cited
UNITED STATES PATENTS

| | | |
|---|---|---|
| 2,103,640 | 12/1937 | Richter .............................. 117/157 |
| 2,259,746 | 10/1941 | Goff et al........................... 117/157 X |
| 2,526,330 | 10/1950 | Clark ................................. 117/157 X |
| 3,068,116 | 12/1962 | Malm et al......................... 117/157 X |
| 3,320,110 | 5/1967 | Gallagher.......................... 131/267 X |
| 3,426,764 | 2/1969 | Pearman............................ 131/267 |

OTHER PUBLICATIONS

Buttrey, D. N., *Plasticizers*, Table III, p. 8–9, 1957.

Modern Plastics Encylopaedia, 1968, pp. 472, 473.

*Primary Examiner*—Michael R. Lusignan
*Attorney, Agent, or Firm*—Finnegan, Henderson, Farabow & Garrett

[57] ABSTRACT

The invention relates to a smoke filter comprising smoke-filter material in sheet form, particularly tissue or crepe paper, coated on either one or both sides with cellulose acetate, preferably in an amount between 5 and 25% by weight, with respect to the said material. It is further concerned with the method of producing such a smoke-filter.

10 Claims, No Drawings

TOBACCO-SMOKE FILTERS

This is a continuation of application Ser. No. 95,370, filed Dec. 4, 1970 now abandoned.

This invention concerns improvements relating to smoke filters, particularly but not exclusively tobacco-smoke filters for cigarettes, cigars and like smoking articles, and to a method for the manufacture of such filters or filtering materials.

A wide variety of fibrous materials have been suggested as filters for cigarette smoke. Crepe paper, cotton wadding, various cellulose derivatives and so forth have been used as filtering materials. Filters made from layers of creped paper or crimped tow of cellulose acetate fibres are also widely accepted. The use of crepe paper lined with cellulose wadding paper is also known.

An object of the present invention is to provide a tobacco-smoke filter comprising cellulose acetate and paper in which the filtering material has a higher filtration efficiency than filamentary cellulose-acetate filters at a comparable pressure drop. The invention also seeks to provide a single filter unit having a filtration efficiency similar to or better than those obtained by known dual filters composed of plugs of cellulose acetate and paper of comparable pressure drop. Finally, it is hoped to provide a filter which can be produced at a lower cost than conventional cellulose-acetate filters by using considerably less cellulose acetate.

According to the invention, filter material in sheet form, for example tissue or crepe paper, is coated on either one or both sides with cellulose acetate. Preferably a solution of cellulose acetate in acetone is employed, but other solvents, for instance methylethylketone, triacetin, triethylene glycol diacetate or mixtures thereof may be used. Preferably the filter material thus treated carries 5% to 25% by weight of cellulose acetate, but the proportion could be higher, say up to 50%.

Suitably the coating may be applied by the rollers of a coating machine. However, other methods may be employed, such as spraying, the centrifugal force of one or more rotational applicators such as one or more rotating brushes or discs or discs provided with holes near the periphery or other conventional means. The coating may be applied all over the sheet or in such a way as to form a continuous or interrupted pattern. The filter material thus treated may be crimped.

So called plasticizers, such as triethylene glycol diacetate, triacetin and dimethylphthalate, may be applied with advantage to the cellulose acetate coating, serving also to improve the firmness of the filter.

The treated filter material may be made into tobacco-smoke filters using a conventional paper filter-rod making machine.

Examples of ways of carrying the invention into effect will now be more fully described:

EXAMPLE 1

A solution of cellulose acetate in acetone, containing 10% by weight of cellulose acetate, was applied to the surface of tissue paper, using a coating machine with rollers. The coated material, containing 21% by weight of cellulose acetate, or 5 grams per square metre area of paper, was formed into a filter rod and cut into sections of 15 mm length. On smoking a cigarette through one of these lengths (giving a pressure drop of 3.8 cm water gauge measured at 1050 cc per minute airflow rate), 49% of the total particulate matter and 43% of the nicotine was retained by the filter. Little or no adverse effect on the taste of the smoke, such as is often associated with paper-type filters, was observed.

In the following Examples 2 to 13, the coating of a filter-paper substrate was effected on a pilot coating machine manufactured by T. H. Dixon and Co. Ltd., of Letchworth. Essentially this machine draws paper from a reel, coats it with a substance in solution, dries it first by means of electrically heated rollers and then by a steam-heated drum, and re-reels it. In the Examples, the machine was operated at a coating speed of 5.3 m/min with the rollers at a temperature of 80°–100°C and the drum at 120°C.

EXAMPLE 2

The paper substrate, a crepe paper of 32 g/m$^2$ weight supplied by Associated Tissues Ltd., of London, W.C.2, was coated with a solution of cellulose acetate in acetone to give a filter material containing 10% by weight of cellulose acetate or 3.2 g/m$^2$ of paper. The material was formed into filter rods and cut into sections of 20 mm length which were assembled into filter-tipped cigarettes. The cigarettes thus formed were smoked using a smoking engine which provided one puff per minute of two seconds duration and 35 ml volume. The proportions of the tobacco smoke constituents removed by the filter of this and the following Examples are shown in the appended Table.

EXAMPLES 3–5

Filter sections were prepared as in Example 2, but using a coating solution of which the concentration was adjusted to give the following levels of cellulose acetate 9% (2.9 g/m$^2$), 11% (3.5 g/m$^2$), 18% (5.8 g/m$^2$) and 21% (6.7 g/m$^2$) respectively, and were assembled into filter-tipped cigarettes and smoked as in Example 2.

EXAMPLES 6–9

The paper substrate was coated as in Example 2 with a solution of cellulose acetate in acetone to give a filter material containing 11% by weight of cellulose acetate (3.5 g/m$^2$). The coated paper was sprayed with a "plasticizer," triethylene glycol diacetate (TEGDA), to give filter material containing the following levels of diacetate: 1%, 5%, 7% and 11% respectively. The treated paper was again formed into filter rods which were cut into sections of 20 mm length and attached to cigarettes. These were smoked as in Example 2.

EXAMPLES 10–13

Filter material was similarly prepared containing 13% by weight of cellulose acetate (4.2 g/m$^2$) and sprayed with triethylene glycol diacetate to give material containing the following levels of the diacetate: 1%, 5%, 7% and 10% respectively. Filter sections made from the material were attached to cigarettes and smoked as in the previous Examples.

For comparison purposes, filter sections with the same pressure drop were made up from the same, but uncoated, paper (Item 14 in the Table) and from filamentary cellulose acetate alone (Item 15). These were attached to cigarettes which were smoked under the same conditions with the results given in the Table. The filtration efficiency, with respect to phenols, of the filters of Examples 2 to 13 is much superior to that of the cellulose acetate filter and is equal to or superior to that of the untreated paper filter, being markedly superior in many of the said Examples.

TABLE

| Example | Pressure Drop (cm water gauge) | Level of TEGDA on paper % | Level of Cellulose Acetate on paper % | Total Particulate Matter removed % | Constituents removed % | |
|---|---|---|---|---|---|---|
| | | | | | Phenols | Nicotine |
| 2 | 5.6 | 0 | 9 | 58 | 68 | 54 |
| 3 | 5.6 | 0 | 11 | 56 | 72 | 50 |
| 4 | 5.6 | 0 | 18 | 59 | 69 | 52 |
| 5 | 5.6 | 0 | 21 | 59 | 69 | 53 |
| 6 | 5.6 | 1 | 11 | 64 | 73 | 55 |
| 7 | 5.6 | 5 | 11 | 61 | 74 | 52 |
| 8 | 5.6 | 7 | 11 | 60 | 75 | 51 |
| 9 | 5.6 | 11 | 11 | 58 | 78 | 46 |
| 10 | 5.6 | 1 | 13 | 64 | 72 | 54 |
| 11 | 5.6 | 5 | 13 | 61 | 73 | 51 |
| 12 | 5.6 | 7 | 13 | 60 | 74 | 48 |
| 13 | 5.6 | 10 | 13 | 58 | 74 | 46 |
| 14 | 5.6 | 0 | 0 | 64 | 68 | 63 |
| 15 | 5.6 | 0 | — | 37 | 48 | 34 |

We claim:
1. A tobacco smoke filter comprising a rod formed from a sheet of tobacco smoke filter paper, said sheet having a surface coating of from about 5 to about 25% by weight, based on the weight of the paper, of cellulose acetate.
2. The filter of claim 1 wherein the coated paper material is crimped.
3. The filter of claim 1 wherein the coating contains a plasticizer.
4. The filter of claim 1 wherein the sheet is coated on both sides.
5. The filter of claim 3 wherein the plasticizer comprises triethylene glycol diacetate.
6. A smoking article comprising a section of smokable material having affixed thereto a tobacco smoke filter comprising a rod formed from a sheet of tobacco smoke filter paper, said sheet having a surface coating of from about 5 to about 25% by weight, based on the weight of the paper, of cellulose acetate.
7. The smoking article of claim 6 wherein the coated paper material is crimped.
8. The smoking article of claim 6 wherein the coating contains a plasticizer.
9. The smoking article of claim 6 wherein the sheet is coated on both sides.
10. The smoking article of claim 8 wherein the plasticizer comprises triethylene glycol diacetate.

* * * * *